United States Patent
Sallot et al.

(10) Patent No.: US 12,428,714 B2
(45) Date of Patent: Sep. 30, 2025

(54) METHOD FOR MANUFACTURING A COMPOSITE TURBOMACHINE BLADED DISK (BLISK) WITH CERAMIC REINFORCEMENT

(71) Applicant: SAFRAN, Paris (FR)

(72) Inventors: Pierre Jean Sallot, Moissy-Cramayel (FR); Jean-Michel Patrick Maurice Franchet, Moissy-Cramayel (FR)

(73) Assignee: SAFRAN, Paris (FR)

( * ) Notice: Subject to any disclaimer, the term of this patent is extended or adjusted under 35 U.S.C. 154(b) by 767 days.

(21) Appl. No.: 17/785,329

(22) PCT Filed: Dec. 10, 2020

(86) PCT No.: PCT/FR2020/052375
§ 371 (c)(1),
(2) Date: Jun. 14, 2022

(87) PCT Pub. No.: WO2021/123577
PCT Pub. Date: Jun. 24, 2021

(65) Prior Publication Data
US 2023/0001480 A1    Jan. 5, 2023

(30) Foreign Application Priority Data

Dec. 20, 2019 (FR) ...................... 1915115

(51) Int. Cl.
*C22C 47/06* (2006.01)
*B22F 3/105* (2006.01)
(Continued)

(52) U.S. Cl.
CPC ............ *C22C 47/064* (2013.01); *B22F 3/105* (2013.01); *B22F 5/009* (2013.01); *B23P 15/006* (2013.01);
(Continued)

(58) Field of Classification Search
None
See application file for complete search history.

(56) References Cited

U.S. PATENT DOCUMENTS

| 5,400,505 A * | 3/1995 | Wei ......................... B22F 5/009 29/889.7 |
| 6,698,645 B1 * | 3/2004 | Buchberger ............ C22C 47/20 228/245 |
| 2011/0027119 A1 * | 2/2011 | Masson ................... C22C 47/04 419/6 |

FOREIGN PATENT DOCUMENTS

| CN | 110560694 A | 12/2019 | |
| DE | 4021547 A * | 1/1992 | ........... B29C 53/566 |

(Continued)

OTHER PUBLICATIONS

Wang, Z., et al. "Microstructure and mechanical behavior of metallic glass fiber-reinforced AI alloy matrix composites." Scientific reports 6.1 (2016): 24384. (Year: 2016).*

(Continued)

*Primary Examiner* — Sally A Merkling
*Assistant Examiner* — Sean P. O'Keefe
(74) *Attorney, Agent, or Firm* — Pillsbury Winthrop Shaw Pittman LLP

(57) ABSTRACT

A method for manufacturing a metal bladed wheel of a turbomachine reinforced by an insert made of metal matrix composite material, includes winding the ceramic fibers around a mandrel in order to form the insert, the ceramic fibers being surrounded by a material constituting the matrix; and spark plasma sintering the insert with a powder of metal constituting the bladed wheel to be manufactured.

10 Claims, 4 Drawing Sheets

(51) Int. Cl.
*B22F 5/00* (2006.01)
*B23P 15/00* (2006.01)
*C22C 47/14* (2006.01)
*F01D 5/28* (2006.01)
*F01D 5/34* (2006.01)

(52) U.S. Cl.
CPC ............. *C22C 47/14* (2013.01); *F01D 5/282* (2013.01); *F01D 5/34* (2013.01); *B22F 2003/1051* (2013.01); *B22F 2301/205* (2013.01); *B22F 2302/105* (2013.01); *F05D 2230/22* (2013.01); *F05D 2300/174* (2013.01); *F05D 2300/177* (2013.01); *F05D 2300/6032* (2013.01)

(56) References Cited

FOREIGN PATENT DOCUMENTS

| | | | |
|---|---|---|---|
| EP | 657554 A1 * | 6/1995 | ............. B21F 17/00 |
| EP | 1 859 897 A1 | 11/2007 | |
| FR | 2 970 266 A1 | 7/2012 | |
| FR | 3 036 409 A1 | 11/2016 | |
| FR | 3 048 630 A1 | 9/2017 | |

OTHER PUBLICATIONS

International Search Report as issued in International Patent Application No. PCT/FR2020/052375, dated Apr. 19, 2021.

\* cited by examiner

[Fig. 1]
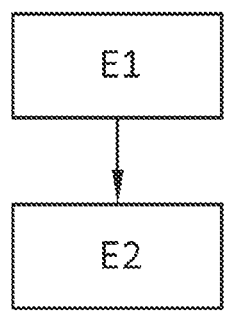
[Fig. 2]
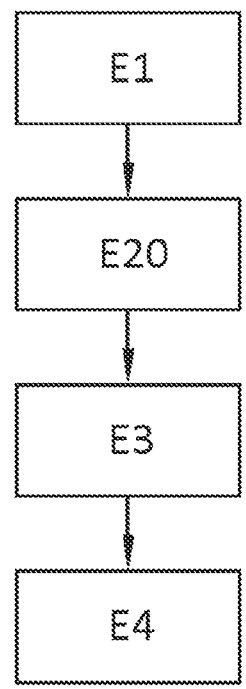

[Fig. 3]
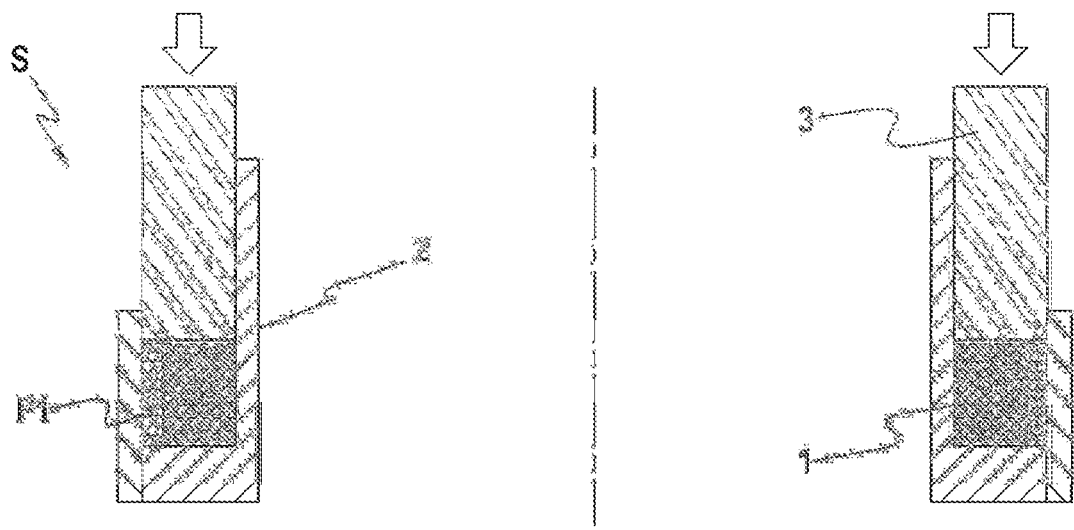
[Fig. 4]
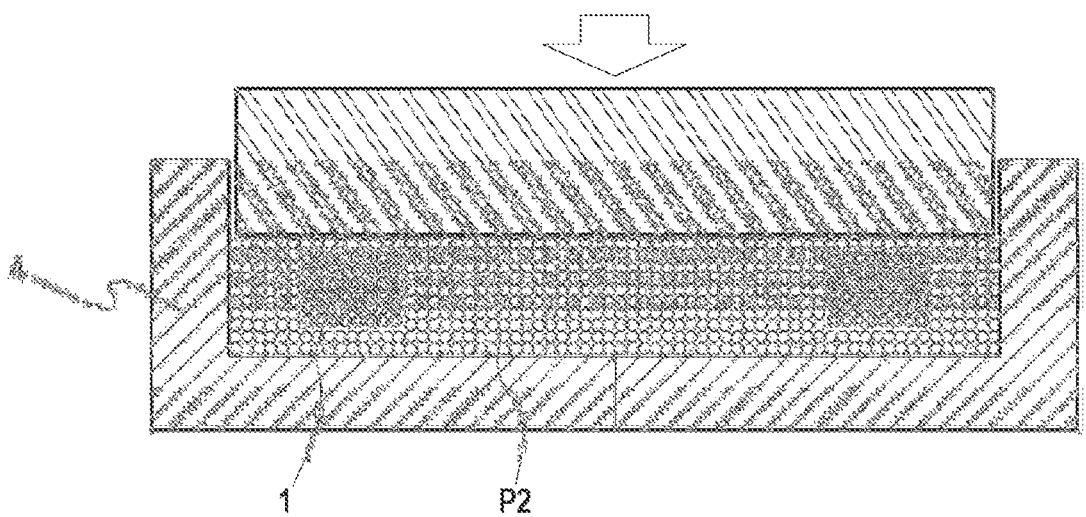
[Fig. 5a]
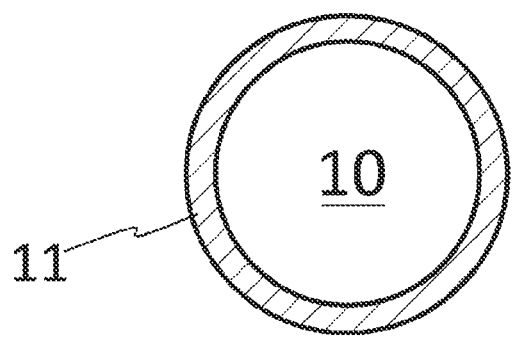

[Fig. 5b]
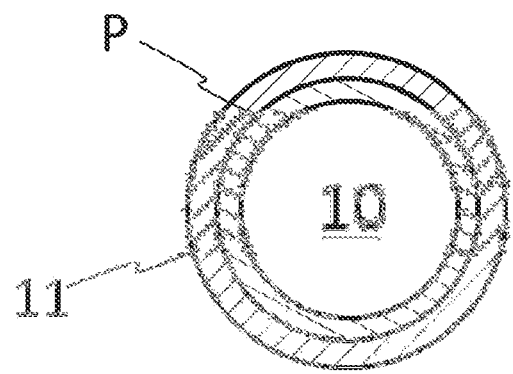
[Fig. 6a]
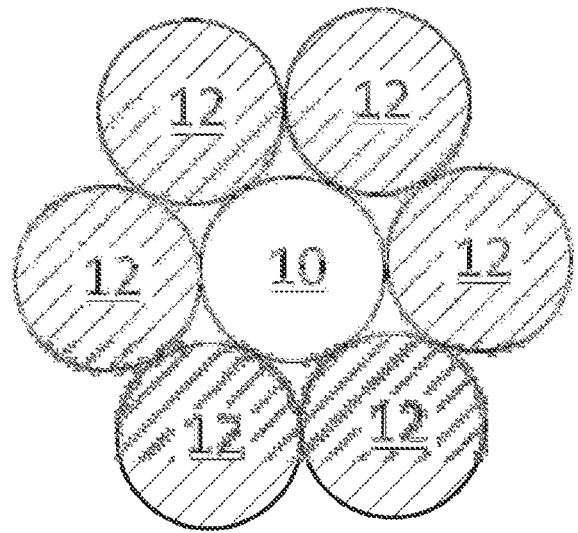

[Fig. 6b]
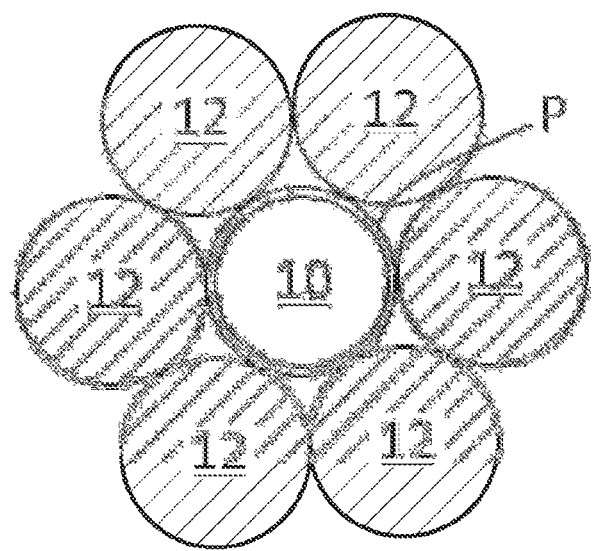

METHOD FOR MANUFACTURING A COMPOSITE TURBOMACHINE BLADED DISK (BLISK) WITH CERAMIC REINFORCEMENT

CROSS-REFERENCE TO RELATED APPLICATIONS

This application is the U.S. National Stage of PCT/FR2020/052375, filed Dec. 10, 2020, which in turn claims priority to French patent application number 1915115 filed Dec. 20, 2019. The content of these applications are incorporated herein by reference in their entireties.

TECHNICAL FIELD

The present invention relates to the general field of the manufacture of a nickel-based metal matrix composite (MMC) material.

The invention finds a particularly interesting application for the manufacture of bladed turbine wheels, and in particular high-pressure turbine wheels, of a turbomachine.

PRIOR ART

It is known from the state of the art to use inserts made of metal matrix composite (MMC) material to reinforce bladed turbine wheels made of metal ahoy. Such inserts are formed by ceramic fibers which reinforce a metal matrix.

Such a solution is used for the manufacture of one-piece bladed rings (BLING).

A bladed wheel reinforced with a MMC insert is generally manufactured according to the following method:
- winding ceramic fibers surrounded by a material constituting the metal matrix on a tool in order to form a wound insert;
- transferring the wound insert into a mold comprising a metal alloy constituting the final part to be manufactured;
- performing a hot isostatic compaction cycle in order to compact and weld by diffusion all the elements present in the mold.

However, the known solutions may encounter several difficulties.

In particular, the temperature and duration of the hot isostatic compaction step must be accurately determined in order to avoid damaging the ceramic fibers on the one hand and ensure good compaction of the part on the other hand.

In addition, the hot isostatic compaction step can lead to deformations as well as a modification in the positioning of the reinforcement in the part.

Finally, during the transfer of the insert of the mold after its winding, the bundle of fibers forming the insert can deform.

DISCLOSURE OF THE INVENTION

The present invention therefore aims to propose a solution for the manufacture of a bladed wheel reinforced by a MMC insert which solves the problems mentioned above.

According to a first aspect, the invention proposes a method for manufacturing a metal bladed wheel of a turbomachine reinforced by an insert made of metal matrix composite material, said method comprising the following step:
- winding the ceramic fibers around a mandrel in order to form the insert, the ceramic fibers being surrounded by a material constituting the matrix; characterized in that the method comprises the following step:
- spark plasma sintering the insert with a powder of metal constituting the bladed wheel to be manufactured.

The use of the Spark Plasma Sintering allows densifying the MMC insert in a very short time, thus making it possible to limit the risk of damage to the ceramic fibers by the appearance of embrittling species by interdiffusion between the fibers and the metal matrix, while ensuring a satisfactory degree of densification.

According to one possible characteristic, the method comprises the following steps:
- performing a consolidation on the mandrel of the insert by spark plasma sintering with a first powder of metal constituting the bladed wheel to be manufactured;
- placing the consolidated insert in a mold comprising a second powder of metal constituting the bladed wheel to be manufactured;
- densifying the insert by spark plasma sintering with the second metal powder in the mold.

According to one possible characteristic, the insert reaches a compaction rate comprised between 60% and 80% at the end of the consolidation step.

According to one possible characteristic, the first metal powder and the second metal powder are different.

According to one possible characteristic, the first metal powder and the second metal powder are identical.

According to one possible characteristic, the ceramic fibers are coated with a layer made of material constituting the matrix.

According to one possible characteristic, yarns made of material constituting the matrix are stranded around the ceramic fibers.

According to one possible characteristic, the bladed wheel is made of nickel-based alloy, the ceramic fibers comprise carbon and are coated with a diffusion protection layer.

According to one possible characteristic, the bladed wheel is made of titanium-based alloy.

According to one possible characteristic, the ceramic fibers are made of silicon carbide.

According to one possible characteristic, the bladed wheel is a one-piece bladed ring.

BRIEF DESCRIPTION OF THE DRAWINGS

Other characteristics and advantages of the present invention will become apparent from the description given below, with reference to the appended drawings which illustrate one exemplary embodiment without any limitation.

FIG. 1 schematically represents the steps of a method for manufacturing a bladed wheel of a turbomachine.

FIG. 2 schematically represents the steps of a method for manufacturing a bladed wheel of a turbomachine according to a possible variant.

FIG. 3 schematically represents a sectional view of the consolidation of an insert on a mandrel on which the fibers forming the mandrel are wound.

FIG. 4 schematically represents a sectional view of the densification of the insert which has been densified beforehand.

FIG. 5a schematically represents a first variant of composition of the insert without a diffusion protection layer.

FIG. 5b schematically represents a first variant of composition of the insert with a diffusion protection layer, FIG. 6a schematically represents a second variant of composition of the insert without a diffusion protection layer.

FIG. 6b schematically represents a second variant of composition of the insert with a diffusion protection layer.

DESCRIPTION OF THE EMBODIMENTS

The invention relates to a method for manufacturing a bladed wheel of a turbomachine, and in particular a bladed turbine wheel. A bladed wheel can be a fixed wheel or be driven in rotation. A bladed turbine wheel is a bladed wheel which is located downstream of a combustion chamber of the turbomachine.

The bladed wheel can be a bladed wheel of a high-pressure turbine that is to say of the turbine located directly downstream of the combustion chamber, or a bladed wheel of a low-pressure turbine that is to say of the turbine located downstream of the high-pressure turbine.

The turbomachine is an aircraft turbomachine, such as for example an airplane turbomachine, or for example a helicopter turbomachine.

As illustrated in FIG. 1 and FIG. 3, a method for manufacturing a bladed wheel of a turbomachine, and in particular a bladed wheel of a turbine, comprises the following steps:

E1: an insert 1 made of metal matrix composite (MMC) is manufactured by winding ceramic fibers which are surrounded by a material constituting the matrix around a mandrel 2. The insert 1 thus manufactured has an annular shape, as seen in FIG. 3.

E2: a Spark Plasma Sintering is carried out with the insert 1 and powder of metal constituting the bladed wheel to be manufactured. The spark plasma sintering is carried out by compacting the metal powder and the insert 1 and by applying an electric current which passes through the metal powder and the insert 1. The spark plasma sintering offers the advantage of being fast, the duration of the spark plasma sintering is in particular less than 15 minutes, which limits the risk of destabilization of the metallurgical structures of the different alloys. Thus, compared to hot isostatic compaction, the risk of damage to the ceramic fibers by the formation of embrittling phases is lower.

Several variants are possible to implement the method illustrated in FIG. 1. In particular, as illustrated in FIGS. 2 to 4, the insert 1 can first be consolidated so that said insert 1 can be handled without risk of deformation, then be completely densified in order to form the bladed wheel to be manufactured.

Thus, as illustrated in FIG. 2, according to one possible variant, the method comprises the following steps:

E1: the MMC insert 1 is manufactured by winding the ceramic fibers surrounded by a material constituting the matrix around the mandrel 2.

E2: the insert 1 is consolidated while remaining on the mandrel 2 by spark plasma sintering of the insert 1 with a first powder P1 of metal constituting the bladed wheel to be manufactured. The first metal powder P1 is added after the winding of the insert 1. Step E20 is implemented by a winding and spark plasma sintering system S which comprises on the one hand the mandrel 2 on which the different fibers of the insert 1 are wound, and on the other hand a spark plasma sintering device 3 which is configured to carry out a spark plasma sintering of the insert 1 with the first metal powder P1 directly on the mandrel 2. The spark plasma sintering device 3 is in particular configured to compress the insert 1 and the first metal powder P1 on the mandrel 2, and to inject an electric current allowing the sintering of the powder. The spark plasma sintering of the step E20 of consolidating the insert 1 is carried out so that the insert 1 can be handled while retaining its shape without the assistance of holding tools. The spark plasma sintering of step E20 can in particular be configured so that the insert 1 reaches a compaction rate comprised between 60% and 80%. The degree of compaction of the insert 1 is in particular a function of the pressure applied during the spark plasma sintering, of the duration of the spark plasma sintering, of the intensity of the current applied during the spark plasma sintering, as well as of the amount of first powder P1 used. Such a compaction rate allows handling of the part without risk of damage, and also allows reducing the duration of step E20, The compaction rate corresponds to the inverse of the porosity rate, a compaction rate of 80% corresponding to a porosity rate of 20%. By porosity rate it is meant here the volume of the porosities divided by the total volume of the part.

E3: the consolidated insert 1 is removed from the mandrel 2 and is placed in a mold 4. A second powder P2 of metal constituting the bladed wheel to be manufactured is also placed in the mold 4. The mold 4 has the shape of the bladed wheel to be manufactured.

E4: the bladed wheel is manufactured by densifying the insert 1 by spark plasma sintering of said insert 1 with the second metal powder P2 in the mold 4. The spark plasma sintering of step E4 allows limiting the risk of appearance of embrittling phases. At the end of the densification step E4, the insert 4 has a compaction rate greater than 95%, and preferably greater than 99%.

At the end of the densification step E4, a turbomachine bladed wheel formed by a MMC fibrous insert 1 which is embedded in metal is obtained.

According to one possible variant that allows creating a multi-material around the insert 1, the first metal powder P1 and the second metal powder P2 are different. The two powders can for example be different by using two alloys with different shades. This variant can in particular allow adapting the mechanical characteristics of the bladed wheel to be manufactured.

According to another possible variant that allows obtaining a more homogeneous bladed wheel, the first metal powder P1 and the second metal powder P2 are identical.

As indicated above, the ceramic fibers of the insert 1 are surrounded by a layer made of material constituting the metal matrix of said insert 1. To do so, several variants are possible.

According to a first variant illustrated in FIGS. 5a and 5b, a ceramic fiber 10 is coated with a layer made of material constituting the matrix 11. The ceramic fiber 10 can be made of silicon carbide or another ceramic comprising carbon, and the layer made of material constituting the matrix 11 can be made of nickel-based alloy or titanium-based alloy. Preferably, when the layer made of material constituting the matrix 11 is made of nickel-based alloy and the ceramic fiber comprises carbon, as illustrated in FIG. 5b, a diffusion protection layer P can be deposited on the ceramic fiber 10, the diffusion protection layer P being located between the ceramic and the metal of the matrix. The diffusion protection layer P can for example be made of tungsten or alumina.

According to a second variant illustrated in FIGS. 6a and 6b, yarns made of material constituting the matrix 12 are stranded around a ceramic fiber 10. The ceramic fiber 10 can be made of silicon carbide or another ceramic comprising carbon, and the layer made of material constituting the matrix 11 can be made of nickel-based alloy or titanium-based alloy. Preferably, when the layer made of material constituting the matrix 11 is made of nickel-based alloy and the ceramic fiber comprises carbon, as illustrated in FIG. 6b, a diffusion protection layer P can be deposited on the ceramic fiber 10, the diffusion protection layer P being located between the ceramic and the metal of the matrix. The diffusion protection layer P can be for example made of tungsten or alumina.

The use of densification by spark plasma sintering of the insert 1 allows in particular reducing the thickness of the diffusion protection layer P, the cycle times being reduced.

The invention is particularly suitable for the manufacture of a one-piece bladed ring (BLING).

The invention claimed is:

1. A method for manufacturing a metal bladed wheel of a turbomachine reinforced by an insert made of metal matrix composite material, said method comprising:
    winding the ceramic fibers around a mandrel in order to form the insert, the ceramic fibers being surrounded by a material constituting the matrix;
    performing a consolidation on the mandrel of the insert by spark plasma sintering with a first powder of metal constituting the bladed wheel to be manufactured;
    placing the consolidated insert in a mold comprising a second powder of metal constituting the bladed wheel to be manufactured, and
    densifying the insert by spark plasma sintering with the second metal powder in the mold.

2. The method according to claim 1, wherein the insert reaches a compaction rate comprised between 60% and 80% at the end of the consolidation step.

3. The method according to claim 1, wherein the first metal powder and the second metal powder are different.

4. The method according to claim 1, wherein the first metal powder and the second metal powder are identical.

5. The method according to claim 1, wherein the ceramic fibers are coated with a layer made of material constituting the matrix.

6. The method according to claim 1, wherein yarns made of material constituting the matrix are stranded around the ceramic fibers.

7. The method according to claim 1, wherein the bladed wheel is made of nickel-based alloy, the ceramic fibers comprise carbon and are coated with a diffusion protection layer.

8. The method according to claim 1, wherein the bladed wheel is made of titanium-based alloy.

9. The method according to claim 1, wherein the ceramic fibers are made of silicon carbide.

10. The method according to claim 1, wherein the bladed wheel is a one-piece bladed ring.

* * * * *